W. L. RILEY.
GYROSCOPE BRAKE.
APPLICATION FILED JUNE 19, 1911. RENEWED JULY 1, 1916.

1,259,293.

Patented Mar. 12, 1918.
10 SHEETS—SHEET 3.

Witnesses:
Inventor:
Willis L. Riley,
by Bradbury
Attorney.

W. L. RILEY.
GYROSCOPE BRAKE.
APPLICATION FILED JUNE 19, 1911. RENEWED JULY 1, 1916.

1,259,293.

Patented Mar. 12, 1918.
10 SHEETS—SHEET 5.

Witnesses:
W. C. Adams
H. Fischer

Inventor:
Willis L. Riley,
by: W. Bradbury
Attorney.

W. L. RILEY.
GYROSCOPE BRAKE.
APPLICATION FILED JUNE 19, 1911. RENEWED JULY 1, 1916.

1,259,293.

Patented Mar. 12, 1918.
10 SHEETS—SHEET 8.

Witnesses:

Inventor:
Willis L. Riley,
by: Attorneys

W. L. RILEY.
GYROSCOPE BRAKE.
APPLICATION FILED JUNE 19, 1911. RENEWED JULY 1, 1916.

1,259,293.

Patented Mar. 12, 1918.
10 SHEETS—SHEET 10.

UNITED STATES PATENT OFFICE.

WILLIS L. RILEY, OF ST. PAUL, MINNESOTA.

GYROSCOPE-BRAKE.

1,259,293.     Specification of Letters Patent.     Patented Mar. 12, 1918.

Application filed June 19, 1911, Serial No. 634,013. Renewed July 1, 1916. Serial No. 107,137.

*To all whom it may concern:*

Be it known that I, WILLIS L. RILEY, a citizen of the United States, residing at St. Paul, in the county of Ramsey and State of Minnesota, have invented a new and useful Improvement in Gyroscope-Brakes, of which the following is a specification.

My invention relates to improvements in motor brakes and its object is to utilize in a brake action upon the axles of vehicle wheels and other rotating mechanism, the resistance of rotating gyroscope wheels to movement of their plane of rotation.

It is a well known fact that a wheel revolving upon an axis perpendicular to its plane offers resistance to a tilting of the axis and that when the axis has been tilted it tends to return to its original position. Under certain conditions this action becomes a rotary one.

I have discovered that by mounting a pair of gyroscopic wheels upon a frame in connection with a revolving shaft and driving the gyroscope wheels by suitable means it is possible to exert upon the shaft a positive or negative acceleration tending to retard the rotation of a revolving shaft or to increase its speed.

In the drawings with which I have illustrated my device and which form a part of my specification.

Figure 1:
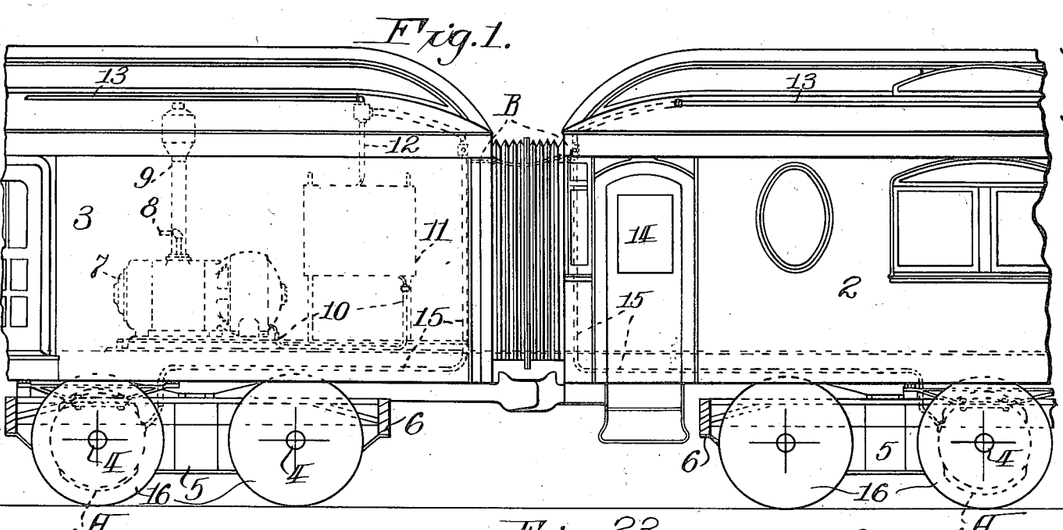
Figure 1 is an elevation of a baggage car and coach coupled together and fitted with my gyroscope brake system.
Figure 2:
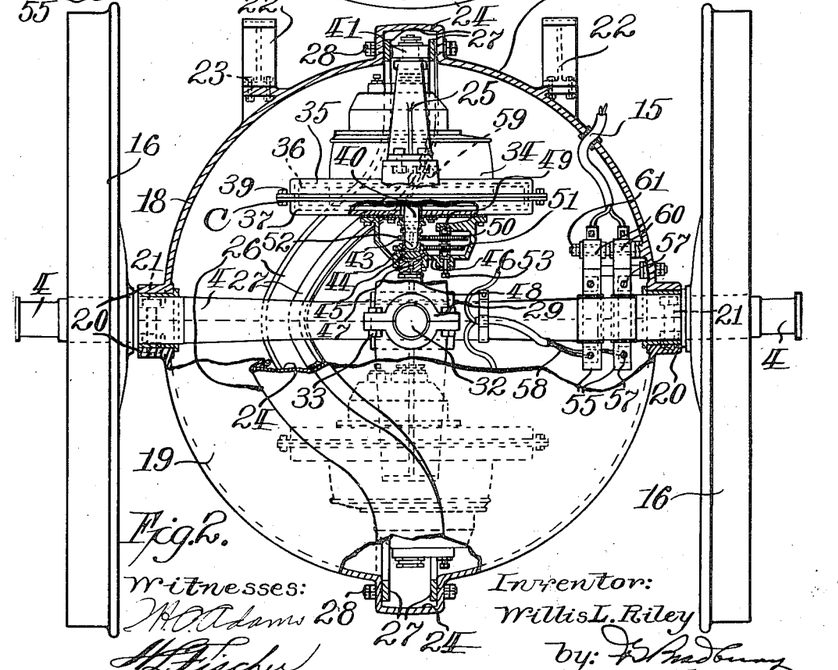
Fig. 2 is a side elevation of a motor brake applied to the axle of a truck as illustrated in Fig. 1.

In Fig. 1 I have illustrated the application of the preferred form of my device to the axles of a railway coach 2 and a baggage car 3. I have shown a motor brake A as illustrated in Fig. 2 attached to an axle 4 of a truck 5 which is journaled in a truck frame 6 supporting the ends of the cars. I have illustrated a brake A in connection with one axle on each truck frame. It may however, be applied to all of the axles supporting the car. In the baggage car 3 is shown a turbo-generator 7 supplied by steam from the locomotive through a supply pipe 8 and having exhaust 9 and supplying electric energy through the mains 10. The mains 10 lead from the generator through suitable conduits to a switchboard 11 in the baggage car. From this point electric energy may be distributed for the lighting, heating and braking mechanism of the car or any other purpose through a train line 12 which is carried along the roof of the cars in conduits 13, extending downward into the vestibules 14 or at the ends of the cars where they are joined throughout the length of the train by connectors B which will be further described in detail. From the vestibule connections of the train line, conductors 15 are carried downward beneath the floor of the coach, and connected with the brake A by a system of trolleys.

Figures 3, 4:
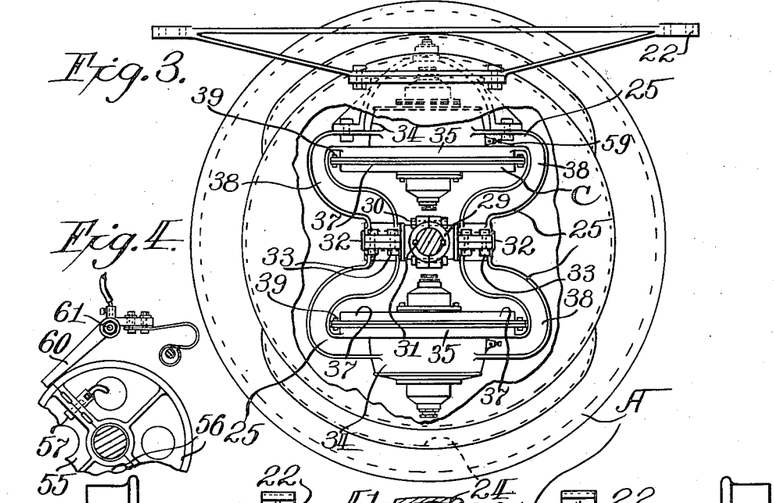
Fig. 3 is a part sectional view of this motor brake transverse to the axle of the truck.
Fig. 4 is a detail of the electric contact wheel shown in Fig. 2.

The gyroscope motor brake A shown in Fig. 1 is illustrated in detail in Figs. 2 and 3. On the axle 4 of the truck 5 are mounted ordinary car wheels 16 which are adapted to roll on the rails 17 of the railway track. Between the wheels 16 on the shaft 4 is mounted a spherical metal shell formed in two halves 18 and 19 which have flanges 20 forming a bearing revolving on the shaft 4 and serving as means for bolting the halves of the shell together by bolts 21. The shell remains in fixed position with relation to the car body, the upper half 18 being fastened to the body of trucks by means of braces 22 fastened to the shell by bolts 23.

A channel shaped groove 24, convex outwardly, extends around the shell transverse to the axle 4 and forms a guideway for the extremity of the frame 25 on which the gyroscope wheels are mounted. The guideway is formed with two deflecting portions 26 on opposite sides of the spherical shell and extending toward the same end of the axle 4. Within the guideway are two guide strips 27 fastened to the walls of the guideway by bolts 28. Within the spherical shell the gyroscope frame 25 is mounted on the axle 4 transversely to the axle. The axle at this point is fitted with a split sleeve 29 fastened together with bolts 30 and keyed to the axle 4 with feather key 31. Each half of the box 29 carries a gudgeon 32 which forms a trunnion bearing for the gyroscope frame 25. The frame 25 is formed in two parts bolted together by bolts 33 and journaled on the gudgeons 32. Integral with each half of the frame 25 is a motor case 34 and the half case 35 for the gyroscope wheel 36 which is journaled within. A cover part 37 lies between the arms 38 of the frame 25 and is attached to the half case 35 by bolts 39. Within the motor and wheel case are journaled the gyroscope wheel 36 and a suitable motor directly connected with the wheel and upon the same shaft 40. This shaft is so journaled in the casing that it lies at right angles to the axle 4 and in the plane of rotation of the frame 25 fixed to the axle.

At one extremity of the frame 25 is journaled a roller bearing 41 which extends into the guide way between the guide strips 27 which it follows during the rotation of the axle and frame within the shell. The opposite extremity of the frame does not extend into the guideway, thus permitting the guide 41 to traverse the guide way with its two deflecting parts formed in the same direction on opposite sides of the shell.

The shaft 40 has two similar bearings, one in the motor case 34 and the other in the cover part 37 and each extremity of the shaft 40 is formed with a thrust bearing 43 which is journaled in a fiber block 44. The fiber block 44 is fixed in a bearing 45 having upon its exterior a gear 46, and being journaled in a second fiber or other suitable bearing formed with a gudgeon pin 47 upon the axis of the shaft and lying within the recess in an adjustable socket piece 48. A secondary shaft 49 is journaled on the casing adjacent to the shaft 40 and carries upon it two gears 50 and 51 of which the gear 50 is the larger and meshes with a gear 52 fixed upon the shaft 40. The gear 51 meshes with the gear wheel 46 fixed upon the bearing 45 and the train of gears serves as a reduction gearing rotating the secondary bearing at a slower rate of speed than the shaft 40 and reducing the friction between the shaft and the parts on which it bears. The adjustment of the bearings is secured by the adjustable socket piece 48 and by a set screw 53 in connection with the secondary shaft 49.

The journaling of the shafts 40 of the two gyroscope wheels at opposite ends of the frame 25 is symmetrical about the axle 4. The motors within the motor casing 34 are supplied with current through electric contact wheels 55 fixed to the axle 4 adjacent to the boxes 20. The contact wheels 55 are formed in two parts 56 convenient for adjustment upon the axle and fastened together by bolts 57 which also serve as binding posts for the conductors 58 which extend from the contact wheel to the electric terminals 59 of the motors. Two brushes 60 are mounted upon a post 61 fixed to the shell 18. The necessary insulation is inserted between the axle 4 and the wheel 55 and between the brushes and their mountings. The electric conductor 15 extending beneath the floor of the cars 1 and 2 connects with the brush 60 to form an electric circuit from the turbo-generator through the motors of the gyroscope.

In this device the action of the motors revolves the gyroscope wheels about a common axis and the movement of the guide 41 following the guide slot through its deflecting parts 26 causes a tilting of the two wheels in the same direction at the same time by the partial rotation of the frame 25 upon the gudgeons 32 during its rotation with the axle 4.

Figure 5:
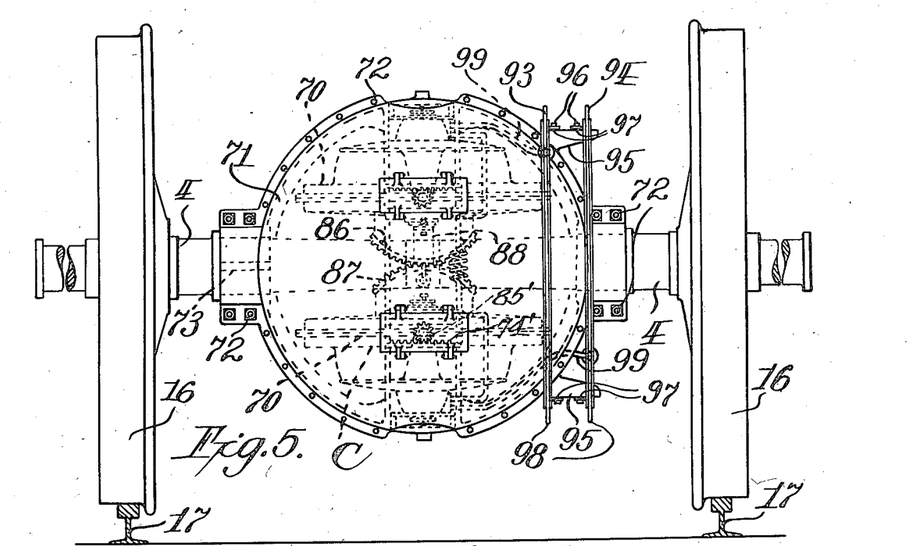
Fig. 5 is an elevation of an alternative form of my device adapted to be used as a brake only.
Figure 6:
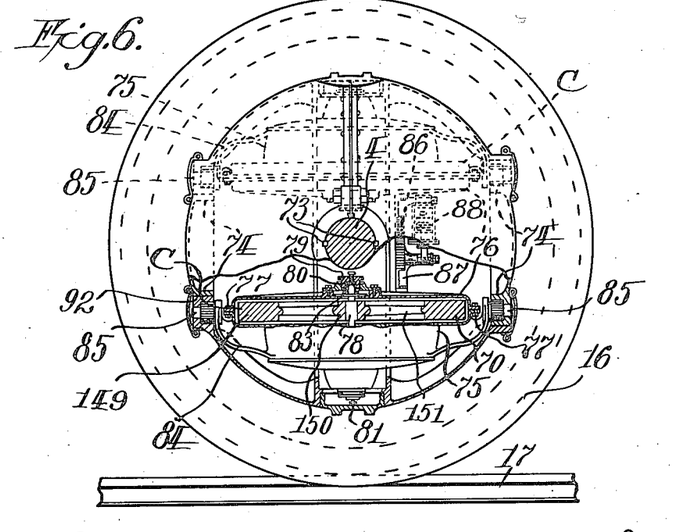
Fig. 6 is a transverse view part in section, of my device as illustrated in Fig. 5.

In Figs. 5 and 6 I have illustrated a form of my device in which a pair of gyroscope wheels 70 revolving with the axle 4 of a car truck act upon each other and are tilted equally in opposite directions. In this construction I use a brake case 71 formed in two parts and fastened together by bolts 72 and keyed to the axle 4 by keys 73. The brake case 71 thus revolves with the axle during the movement of the car and carries with it the gyroscope frame 74 which lies within the brake casing and is integral with it. The gyroscope wheels 70 and their attached motors lie within a casing 75 to which is attached a cover part 76 by means of bolts 77. The gyroscope wheel and motor mounted on a common axle 78 are journaled in the two parts of the casing. A socket piece 79 is threaded into the casing at each extremity of the shaft 78 and carries a fiber bearing piece 80 adjustable to the socket piece 79 by means of a screw 81 threaded therein. The shaft 78 forms a thrust bearing in the bearing piece 80 and also carries a ball-bearing cone 82 which coöperates with a recess in the socket piece 79 to receive balls 83 forming a ball bearing for the shaft. This form of bearing is provided at each end of both shafts 78. The casing 75 is journaled in the brake casing 71 by means of a bracket 84 integral with the casing 75 and carrying gudgeons 85 which are journaled in suitable bearings 92 in the brake casing 71. The axis of the gudgeons lies transversely to the axle 4 and allows the tilting of the gyroscope wheel and its inclosing case toward the axle 4. On the adjacent faces of the gyroscope covers 76 are formed intermeshing gear sectors 86 and 87 which are circumferential to the axis of the gudgeons 85 causing the rotation of one gyroscope wheel on the axis of the gudgeons to produce an equal movement of the other wheel from its plane of rotation. The gear sectors 86 and 87 lie parallel with the axle 4 and the tilting rotation of the gyroscope wheel produced by the rotation of the gyroscope wheels about the axle 4 is controlled by a dash-pot 88 pivoted upon the sector 86 and having a piston 89 operating within it and pivoted upon the sector 87.

Referring to Figs. 5 and 6, the two gyroscope wheels 70 are driven by individual motors, their directions of spinning being opposite. The revolving of the truck axle 4 produces "precession" (tipping). It should be understood that the revolving of truck axle does not produce "precession" until the power is applied to the gyroscope wheel motors and the gyroscope wheels are "spinning." Instantly the wheels 70 "nutate" (tilt) and as shown in Fig. 5 the adjacent side of the wheels 70 nutate or tilt toward each other. In tilting they trunnion upon their gudgeons 85 to which are secured the gear pinions 85' which mesh with the gear racks 74'. These racks are shown on the one side as being outside of the pinions and on the opposite side they are placed inside of the pinions so that when the wheels 70 tilt the gears roll on their racks and partially rotate the wheels 70 and their casings in the plane of spinning. This causes the phase difference between the tipping and tilting of the wheels 70 to become less than 90 degrees and with the assistance of the dash pot 88 the wheels 70 are righted or returned to parallel planes of spinning momentarily only, then they tip and tilt again in theory only. In reality the resultant of these tipping and tilting movements and forces, in conjunction with the phase retarding and dash pot resistance, produces or permits only slight movements of the wheels 70 from their planes of spinning except their revolving with the axle 4, which they are forcibly retarding. I have elected to call the first gyroscopic movement "precession" and the second movement "nutation." The mechanical rotation "precession" of the axle and inactive gyroscope cannot be called "precession" in gyroscopic sense; what I choose to call "precession," has however, a movement in this same direction (rolling with the axle), but is a "precessional" movement only when the motors become active to spin the gyroscope wheels. Such a precession produces a forceful movement, which I choose to call "nutation." "Nutation" is at right angles to "procession."

Figure 33:
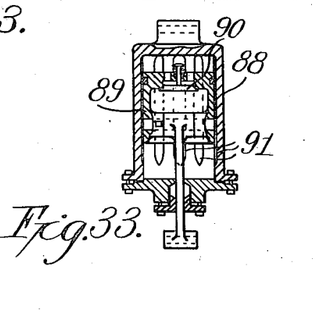
Fig. 33 is a sectional view of an oil dash pot as illustrated in Figs. 5 and 6.

The piston 89 has a valve 90 in its extremity and is adapted to be opened for the passage of oil at the end of the return portion of the stroke of the piston. During the outward portion of the stroke of the piston the valve 90 closes and part of the oil passes through by-pass grooves 91 in the wall of the dash-pot. Below the by-pass grooves the oil is compressed by and acts as a cushion for the piston.

The operation of the motors connected with the gyroscope wheels is secured by electric contact wheels 93 and 94 mounted upon brackets 95 which are integral with the shell by means of bolts 96 and insulated with any suitable material 97. The contact wheels are formed with tracks 98 adapted to receive a suitable trolley attached to the body of the car and are connected with the motors by suitable connectors 99.

Figs. 7 to 11 inclusive illustrate an alternative construction of gyroscope or motor brake which may be attached to any suitable structure such as a car body or motor foundation represented by the supports 100 in which is journaled the axle 101 on which the pairs of gyroscope wheels C are mounted. Each pair of wheels is mounted on a transverse frame 103 formed in two parts which are fastened together by bolts 104 and journaled on the gudgeons 105 connecting with the sleeve parts 106 (see Fig. 8) which are keyed on the shaft 101. The gyroscope wheels C with their attached motors are fixed upon shafts 107 journaled in casings 108 secured to the gyroscope frame 103 and are adapted to rotate upon a common axis passing through the intersection of the axes of the gudgeons 105 and axle. The axes of the gudgeons 105 of the two pairs of wheels are parallel and are spaced apart upon the axle 101 sufficiently to permit a considerable rotation of the gyroscope frames 103 upon the gudgeons.

Figures 7, 8, 9, 10, 11:
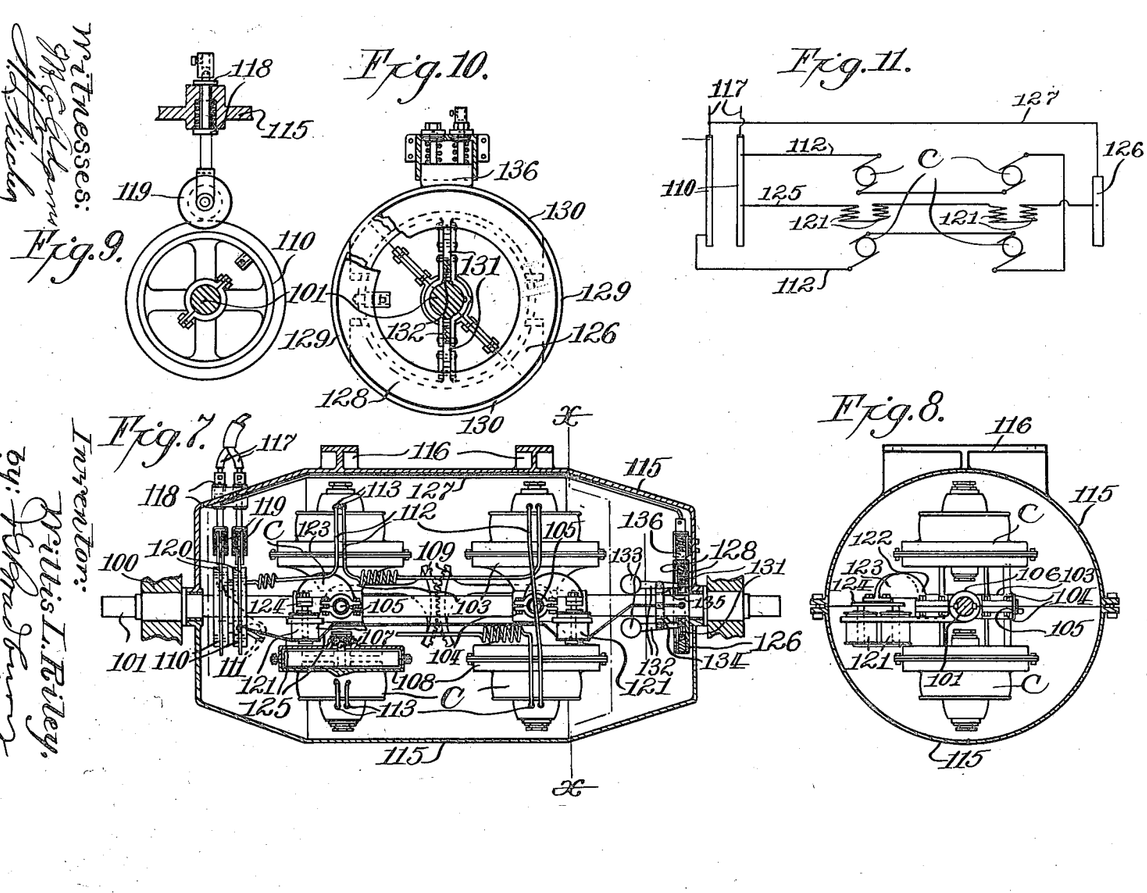
Fig. 7 is a side view of an alternative form of my motor brake.
Fig. 8 is a section on the line X—X, Fig. 7.
Fig. 9 is an enlarged detail of the electric contact wheel and trolley shown in Fig. 7.
Fig. 10 is a detail of the electric contact wheel operating the tilting solenoid.
Fig. 11 is a diagrammatic view of the electric wiring as used in Fig. 7.

On the adjacent sides of the gyroscope frames are gear sectors 109 which are formed integral with the parts of the gyroscope frames 103 and adapted to intermesh during the rotation of the frames upon the gudgeons 105.

The operation of each of the motors and gyroscope wheels is secured through electric contact wheels 110 mounted upon the axle 101 to rotate therewith and having electric connections 111 for suitable conductors 112 leading from the contact wheels to the terminals 113 of the motors. The entire rotating structure is protected by a suitable casing 115 attached by brackets 116 formed integral with the casing 115. Electric conductors 117 leading from the electric power line pass through a suitable insulation 118 in the casing and connect with trolley wheels 119 fixed to the casing and arranged to operate upon the contact surfaces 120 of the contact wheels 110 supplying power to the gyroscope motors.

The operation of the pairs of gyroscope wheels C as a motive power requires the tilting of the gyroscope wheels upon the gudgeons 105 and this is accomplished by means of a pair of solenoids 121 which is mounted upon an arm 122 keyed to the axle 101. A bracket 123 is connected with the gyroscope frame 103 at right angles to the gudgeons 105 and carries at its extremity a yoke 124 bearing the cores of the solenoids which operating within the solenoid windings 121 produce a tilting of the gyroscope frame 103 upon the gudgeons 105 through a short arc. The application of electric current to the windings of the solenoids 121 produces a movement of the solenoid cores and consequently a tilting of the gyroscope frames 103. This application of power is secured by suitable conductors 125 connected in series from one of the contact wheels 110 through the windings of the solenoids, an electric contact wheel 126 mounted upon the axle 101 to revolve with it and a conductor 127 connected with the trolley 119 working upon the other contact wheel. The contact wheel 126 is keyed upon the axle 101 and consists of two side portions 128 carrying between them electric contact segments 129 and 130 two of which are fixed in position opposite each other and two, opposite each other at right angles to the fixed pair, are movable radially between the side portions 128 of the wheel. The two movable segments 130 are connected by links 131 with the arms 132 of a ball governor 133 which are pivoted in a ring 134 fixed upon the axle 101. A spring 135 operates against the arms 132 of the governor and opposes the centrifugal force of the balls 133. At the normal speed of the axle 101 the spring 135 operates to hold the movable segments 130 between the side portions 128 and the contact wheel 126. The brush 136 operating upon the contact wheel to produce an electric connection through the solenoids 121 ceases to make contact with the movable segments 130 and completes the circuit only during the passage of the fixed segments 129 beneath the brush, in this way reducing the number of electrical impulses through the solenoid by one-half and reducing the corresponding number of tiltings of the gyroscope frames.

Figure 12:
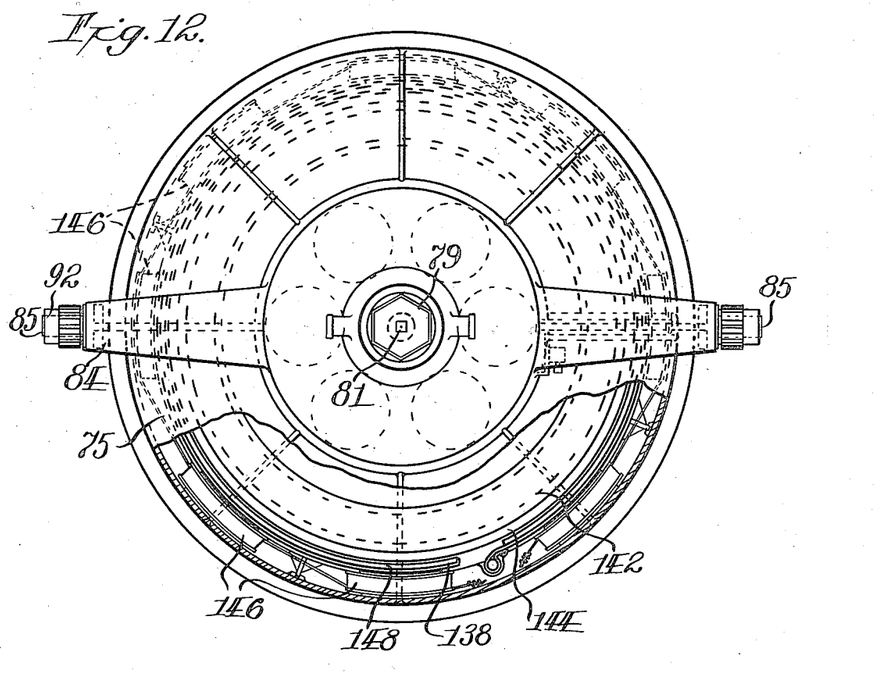
Fig. 12 is an elevation of a gyroscope wheel and its attached drive motor illustrating a convenient form of brake for the gyroscope wheel.
Figure 13:
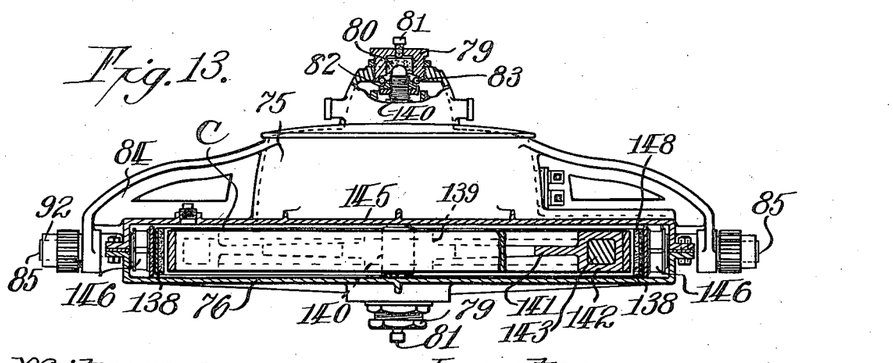
Fig. 13 is a partly sectional view of the same wheel.

In Figs. 12 and 13 I have illustrated the construction of my gyroscope wheel C and a suitable magnetic brake 138 to be used in overcoming the momentum of the wheel after its operation as a brake. The wheel illustrated is formed with a metallic hub 139 secured to the steel shaft 140 with which it rotates. The web 141 of the wheel is apertured to increase its radius of gyration. The rim 142 of the wheel is formed hollow and is filled with lead 143 or other suitable material. Upon the outside of the rim is shrunk a metal band 144 for the purpose of strengthening the wheel and making it more resistive to centrifugal forces. The shaft 140 on which the wheel rotates also carries the motors operating the wheel and is journaled in a combined ball and thrust bearing similar to that described in connection with Figs. 5 and 6. The motor is mounted within a casing integral with the wheel case 145. About the periphery of the wheel and within the case 145 are fixed a series of magnets 146 attached to the inside of the casing 145 and extending around the periphery of the wheel. The magnets 146 are connected in series with a shunt from the power conductors driving the motor of the gyroscope. Between the spring brake 138 and the wheel rim 142 is a wearing strip 148 formed of fiber or other suitable substance which the spring action of the brake is adapted to force against the periphery of the wheel to stop its rotation. Upon applying electric power to the motor which drives the wheel, the shunt windings become operative and draw the spring brake away from the rim of wheels C leaving it free to rotate. As soon as the motive power is cut off the magnets cease to be active and the resiliency of the spring brake clamps it upon the periphery of the wheel to stop its rotation.

The construction of the gyroscope wheels may be various in the different forms of my device. In Fig. 6 is illustrated a wheel C having a solid cast rim 149 connected to the hub 150 by suitable web-like spokes 151 having sufficient strength to resist the momentum of the rim in rotating at high velocities.

Figures 14, 15, 16, 17, 18:
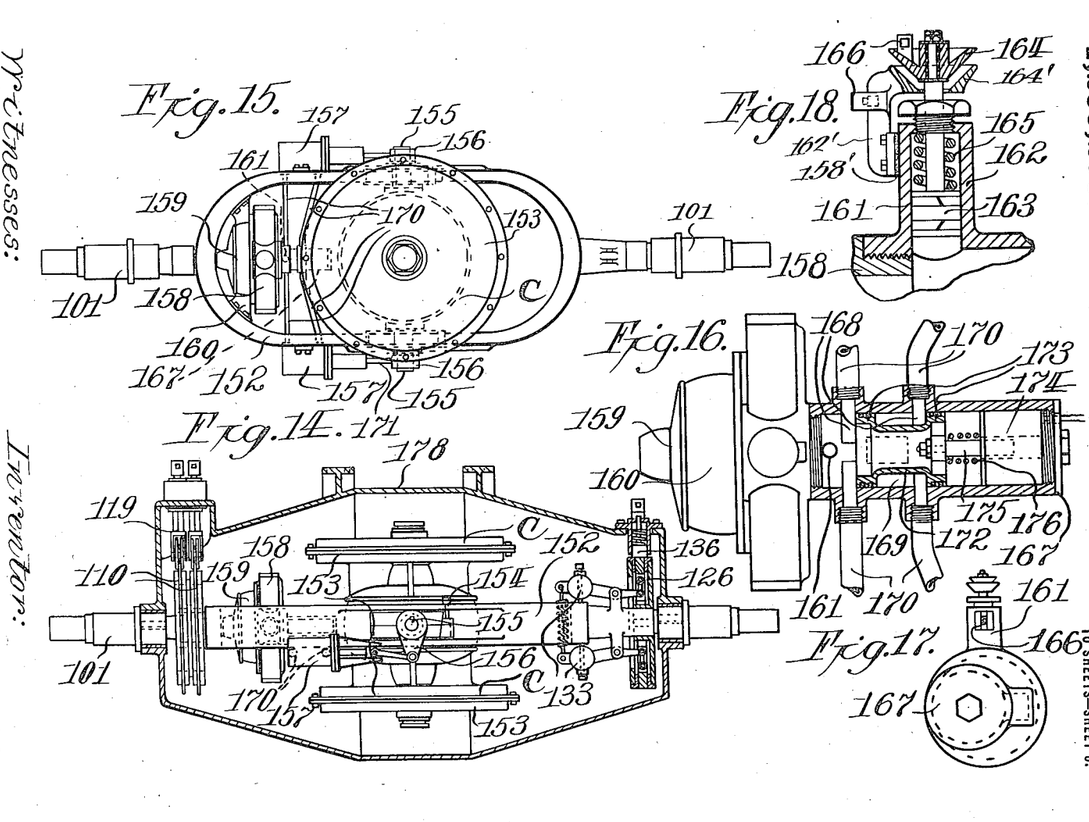
Fig. 14 illustrates an alternative construction of my device.
Fig. 15 is a plan view of the same form of device.
Fig. 16 illustrates a fluid pump used in connection with Fig. 14.
Figs. 17 and 18 illustrate details of said fluid pump.

The method of driving the gyroscope wheels C may also be varied. In the preceding figures I have illustrated a gyroscope wheel and motor directly connected, each wheel having an individual motor. In Figs. 14 and 15 I have shown an alternative construction of mounting my device, the rotating axle 101 being yoked and forming a frame 152 within which a pair of gyroscope wheels C are mounted in a casing 153 and a motor 154 connected to both.

Upon the casing of the motor are mounted gudgeon pins 155 having their axis parallel to the plane of the rotating gyroscope wheels and at right angles to the axis of the axle 101. The gudgeons 155 are journaled in the frame 152 and permit the rotation of the gyroscope wheel casing 153 in a plane longitudinal to the axle 101. The rotation of the casing 153 upon the gudgeons 155 is secured by rocker arms 156 attached to the ends of the gudgeons 155 outside their bearings and operated by a piston or plunger 157 and fluid or air pump 158 illustrated in Figs. 14, 15, 16, 17 and 18. A rotary fluid or air pump 158 is operated by a motor 159 directly connected to the pump and journaled in a casing 160 attached to the yoked axle 101. Mounted on the motor casing 160 is an automatic cut out 161 formed by a sleeve 162 in which is slidably mounted a piston 163 carrying at its upper end conical contact head 164. The piston 163 is operated by the pressure of fluid within the pump 158 against the pressure of a spring 165. As the pressure in the pump 158 lowers the piston 163 moves downward bringing its contact piece 164 in contact with the contact cone 164' secured to the sleeve 162 by the bracket 162' which is insulated from sleeve 162 as shown at 158'. The contact sleeve 162 and contact head 164 carry terminals 166 for an electric circuit which is connected with the conductors of the gyroscope wheel drive. The closing of the circuit due to the lowered pressure in the pump 158 operates the pump motor 159 and pump 158 forcing oil into the pressure cylinder 167. The cylinder 167 has two pairs of ports 168 each pair being connected to a corresponding end of the piston chambers 157 by pipes 170. The pistons operating in the piston chambers 157 are connected by links 171 to the rocker arms 156 which are connected with the gudgeons 155 on the wheel case 153 and the tilting of the wheel case 153 is determined by the flow of fluid through the ports 168 to the different ends of the piston chambers 157. This movement of fluid from the pressure cylinder 167 is governed by a sleeve valve 172 within the cylinder having two annular packing rings 173. The movement of the sleeve valve is secured by means of solenoid 174 mounted on the axis of the cylinder 167 and a core 175 directly attached to the valve and operating in the solenoid. A compression spring 176 lying between the valve 172 and the wall of the valve cylinder 167 operates to return the valve 172 after it has been closed by the solenoid.

Figures 19, 20, 21, 22:
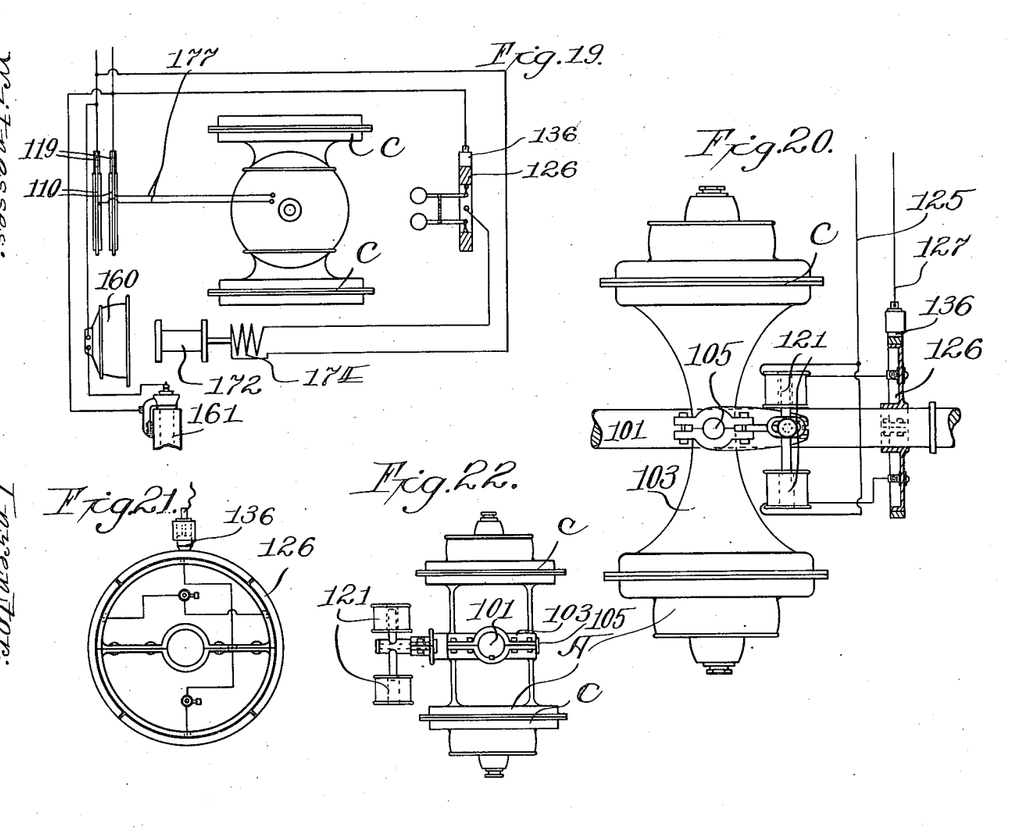
Fig. 19 is a diagrammatic view of the wiring used in the operation of my device as illustrated in Fig. 14.
Fig. 20 illustrates an alternative form of my device.
Figs. 21 and 22 are detail views of the alternative form shown in Fig. 20.
Figure 23:
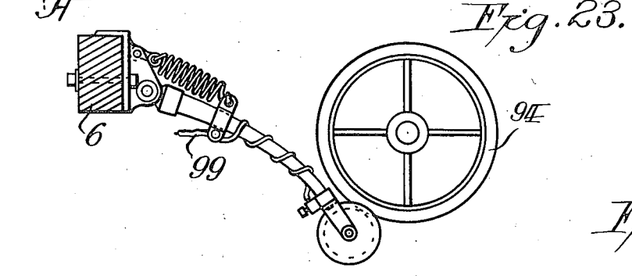
Fig. 23 is a side view of the trolley used in the form of gyroscope illustrated in Figs. 5 and 6.

The electric power for operating the gyroscope wheel motor illustrated in Figs. 14 and 15 is secured through contact wheels 110 fixed upon the axle 101. Suitable conductors 177 as illustrated in Fig. 19, connected to the contact wheels and with the terminals of the motor and the contact wheels 110 are supplied with current by trolleys 119 fixed in the stationary casing 178 surrounding the gyroscope and contacting with the surface of the wheels. The third contact wheel 126 is mounted on the axle 101 and current is supplied to it from the trolleys 119 through a brush 136 mounted on the casing. The contact wheel 126 is similar in construction to that described in connection with Fig. 8 and has a governor 133 similarly connected to operate the solenoid 174 connected with the pump 158. By this means the flow of liquid or air into the piston cylinder 169 is controlled to vary the number of tilts transmitted to the gyroscope cases 153 according to the speed of rotating the axle 101. In Figs. 20, 21 and 22 the solenoids 121 are placed one above the other and the electric contact wheel 126 and the other coöperating parts are designed to operate in conjunction into said solenoids. The solenoids in this construction have a double action one pulling in one direction and the other in its turn pulling oppositely in order to give a greater precessional movement.

Figure 24:
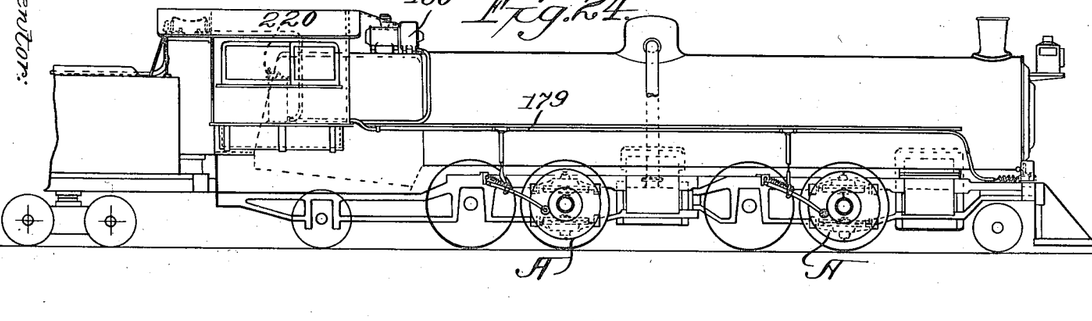
Fig. 24 illustrates the form of brake shown in Fig. 13 applied to a locomotive.
Figures 25, 26, 27:
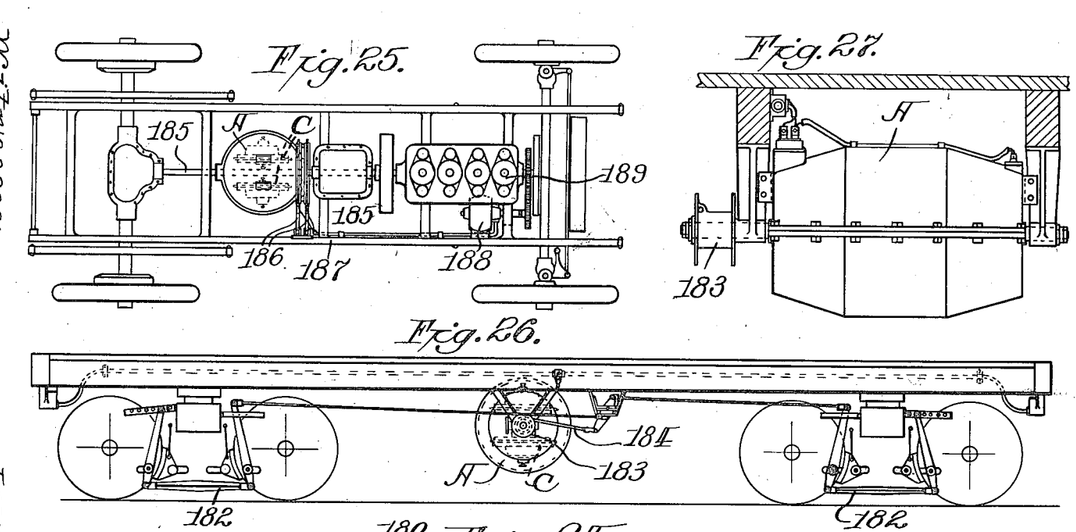
Fig. 25 illustrates the application of the same device to an automobile.
Fig. 26 illustrates the use of my device as shown in Fig. 7 in connection with the ordinary friction brake system used on railway cars.
Fig. 27 is an end view of my device as illustrated in Fig. 26.

In Fig. 24 I have shown the application of a gyroscope brake to a locomotive. The construction of this brake is similar to that in Figs. 15 and 16. The electric conduit 179 which supplies power to the gyroscope motors is carried along the side of the locomotive. A turbo-generator 180 is shown mounted upon the locomotive and adapted to supply current to the locomotive brakes and for other purposes on the train. In Figs. 26 and 27 I have illustrated a motor similar in construction to the brake mechanism described in connection with Figs. 7 to 11 inclusive, mounted upon the platform 181 of a car and adapted when operated, to actuate a friction brake system 182 similar to that now used in connection with railway trucks. The gyroscope in this form of device is used entirely as a motor and has a drum 183 mounted on its axle to carry a flexible connection 184 operating the brake system. In Fig. 25 I have shown an automobile truck having an engine transmission and differential such as is ordinarily used in automobiles and a gyroscope brake C mounted upon the driving shaft. This gyroscope is similar in construction to that described in detail in Figs. 5 and 6, the drive shaft 185 of the automobile taking the place of the truck axle 4 illustrated in Fig. 5. Suitable trolleys 186 are mounted on the automobile frame 187 to form an electric connection with the contact wheels of the gyroscope and are connected with any suitable source of power such as the dynamo 188 which is operated by the engine 189 of the automobile.

Figure 30:
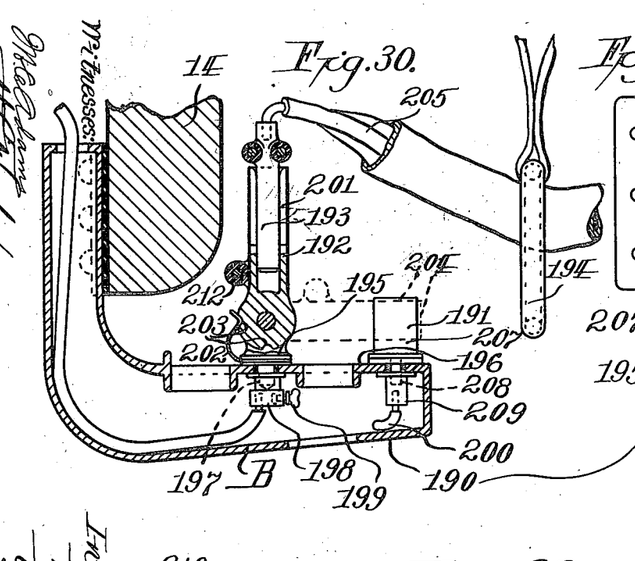
Figs. 30 to 32 inclusive, are enlarged details of the electric connections.
Figure 31:
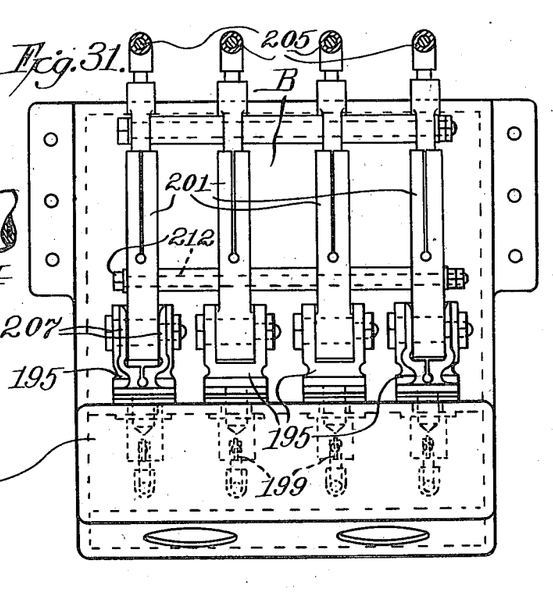
Figure 32:
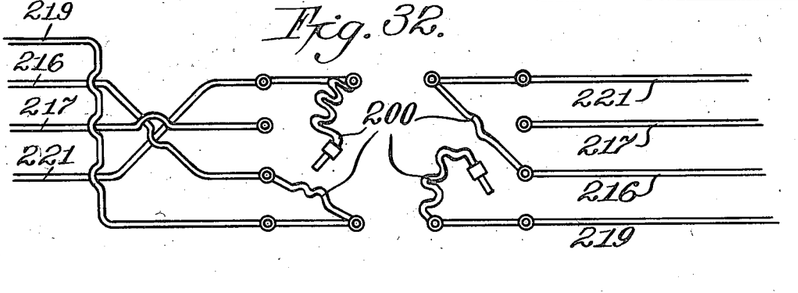

In Figs. 30 to 32 inclusive I have shown details of my automatic train connector B by which the electric circuits of a train are completed between the different cars and in case the train breaks apart, are automatically closed in such a manner as to operate the brakes of the gyroscope system used on the train.

Figure 28:
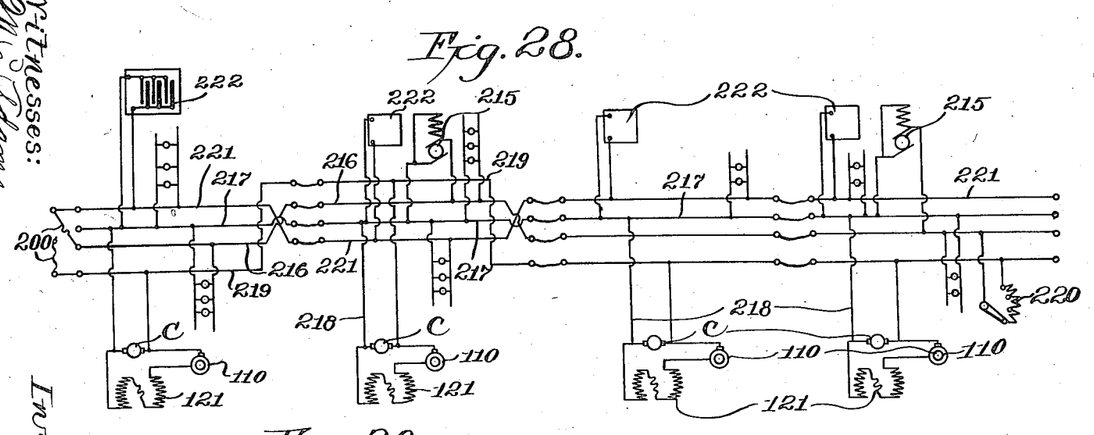
Fig. 28 is a complete wiring diagram of a train consisting of a locomotive, tender, baggage car and coach.

A system of electric circuits which is adapted to accomplish the purpose of my invention is shown diagrammatically in Fig. 28. The wires of these circuits may be carried in suitable conduits as described heretofore, on the roofs of the train. The extremities of the wires are carried into the vestibules of the cars and connected with the connectors B. The connectors B consist of a bracket 190 supported on the vestibule 14 at each end of the car and carrying a fixed terminal 191 and a pivoted movable terminal 192 coöperating with the fixed terminal and fitted to receive a removable plug 193 similarly connected with the pivoted terminal on an adjacent car. The plug 193 is carried loosely by a hanger 194 adapted to be attached to one of the vestibule doorways. A hinge post 195 passes through the top wall 196 of the bracket 190 being fixed thereon by a stud 197 set in a socket piece 198 below the wall 196. The socket piece 198 receives the end of one wire of the train line and has a binding post 199 for the connection of a circuit closer 200.

On the hinge post 195 is pivoted a female coupler terminal formed with split spring sleeves 201. The coupler is so pivoted as to rotate in a vertical plane longitudinally of the car and a spring 202 fixed to the hinge post 195 and engaging notches 203 in the coupler tend to hold the coupler in the vertical position shown or in horizontal position 204 shown dotted. The plugs 193 are connected to suitably insulated train conductors 205.

The plugs 193 connected with the movable terminals 192 on two cars in the manner indicated in Fig. 30 connect the corresponding conductors of the two cars electrically and in case the cars break apart will positively force the movable terminals 192 into the position 204 as illustrated in dotted lines.

The fixed terminals 191 with which the movable terminals 192 coöperate consist of a spring yoke 207 mounted on the top wall 196 of the bracket 190 by means of a stud 208 and socket piece 209 in a manner similar to the hinge post 195. The fixed terminals 191 are shown in connection with the outer movable terminals only and the circuit closers 200 are connected with the socket pieces 198 of the movable terminal 192 at pleasure.

When the movable terminals 192 are forced into their horizontal position the sleeve portions 201 are forced between the arms of the spring yokes 207 and an electric connection is formed from one wire of the train system through the fixed terminal and the circuit closer to that wire of the train system to which the circuit closer is connected. The movable terminals 192 are fixed rigidly together by means of a bolt 212 passing through the sleeve parts and insulated from them.

In Fig. 28 I have shown generators 215 on the engine and in the baggage car operating in multiple to supply power to the train. The terminals of the generator connect with the conductor 216 and conductor 217 which latter also carries one of the terminals of the gyroscope circuit 218 including the solenoid windings for tilting the solenoids to operate the gyroscopes.

The other terminal of the gyroscope winding connects with the gyroscope wire 219 which in running is connected with the wire 218 only through the controller 220 which is located in the cab of the locomotive or operative for emergency purposes from other points. A light wire 221 is shown normally connected with the wire 216 through a circuit closer 200 at the rear of the train, the movable terminals at that point being in horizontal position. A storage battery 222 is shown connecting to wires 217 and 221 and in an electric circuit through the circuit closer 200 with the generator 215.

Figure 29:
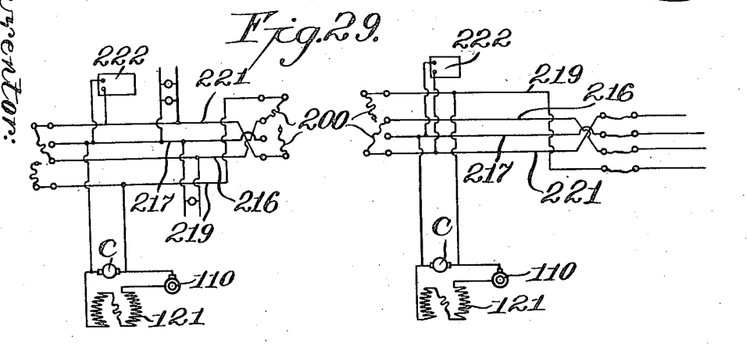
Fig. 29 is a diagram of the electric connections appearing in Fig. 28 illustrating a coach broken away from the train.

When a car becomes disconnected from the train as shown in Fig. 29 the circuit closers 200 being in position as shown at the front and rear of each coach, the pulling out of the couplings 193 as the train breaks pulls the movable terminals into their horizontal position and form connections at the rear of the car between wires 216 and 221, and at the head of the car between wires 216 and 219, thus throwing the gyroscope into the circuit with the battery 222 and operating it to stop the car.

The wires 216, 217, 219 and 221 are so arranged at their extremities in the movable terminals and reversed in position across the car at opposite ends of the car so that the cars when turned around in switching will have terminals on adjacent ends in proper position to connect the circuits in the train.

In the operation of my device I use the principle of gyroscope action that when a gyroscope wheel is revolving on its axis and the axis is tilted in a plane at right angles to the plane of the wheel, a tilting or rotative tendency is set up in the axis at right angles to the plane of tilting and in the direction in which that side of the wheel moves toward which the axis is tilted.

This tendency to rotate at right angles to the tilt may be utilized as a negative acceleration in brakes or as a positive acceleration to produce motor action. It is used in all forms of my device shown, the tilting being secured in the form shown in Fig. 2 by means of the deflecting portion of the guide groove, and in the form shown in Fig. 7 by means of electric solenoids which operate at intervals as described. In Fig. 14 I have shown the same general principle, the mechanism being operated by fluid or air pressure. The mechanism by which I secure this operation of the parts has been described in detail, its object being in every case to produce a tilting in the axis of the gyroscope at intervals the frequency of which may be regulated automatically. The device shown in Figs. 5 and 6 does not require a tilting device as it uses a dash pot retardation of the natural tilting tendency of the wheel in rotating with the axle on which the brake is mounted.

In accordance with the patent statutes I have described the principles of operation of my invention together with the apparatus which I now consider to represent the best embodiment thereof but I desire to have it understood that the construction shown in only illustrative and that the invention can be carried out by other means and applied to uses other than those above set forth within the scope of the following claims.

Having described my invention, what I claim as new and desire to protect by Letters Patent is:—

1. A rotative member, a frame mounted on said member transversely thereof to rotate therewith and adapted to oscillate longitudinally of said rotative member, a gyroscope wheel journaled on said frame having its axis normally normal to the axis of said rotating member and means connected with said frame and said rotative member to tilt said frame and the axis of said gyroscope for the purposes set forth.

2. In combination with a vehicle axle, a gyroscope movably associated with said axle, means for driving said gyroscope, and means for moving said gyroscope to retard the rotation of said axle.

3. A vehicle axle, a frame mounted on said axle to rotate therewith, a gyroscope frame journaled on said frame and having a gyroscope wheel mounted therein, with its axis normally in the plane of rotation of said frame, means for operating said wheel, and means tending to resist the deflection of said axis from its normal position during the rotating of said axle, said means being associated with said axle to apply its resisting tendency to retard the rotation of said member.

4. A vehicle axle, a gyroscope mounted in connection with said axle, means for tilting the axis of said gyroscope with relation to said axle, and a governor connected with said rotative member and with said tilting means to regulate the repetition of tiltings whereby the acceleration due to said gyroscope action may be automatically governed.

5. A vehicle axle, a brake adapted to coöperate with said axle and by gyroscopic action to retard it, and means for applying said gyroscopic action to retard the rotation of said axle.

6. Driven elements, gyroscopes mounted to influence the revolution of said elements by their action and means controlled from a remote distance for varying the position of said gyroscopes to simultaneously affect the rotative movement of said elements.

7. Driven elements, gyroscopes mounted to retard the driving operation of said elements, and motors for actuating said gyroscopes and controlled simultaneously in their operation from a remote distance.

8. Rotatively driven elements, gyroscopes in coöperation with said elements to influence their rotative operation, electric motors operatively connected to said gyroscopes to revolve their rotative members, an electric connection with said motors for operating them from a remote distance simultaneously, and means for applying the action of said gyroscopes to retard the rotative operation of said elements.

9. A plurality of rotative members, a pair of gyroscopic wheels associated with each of said members, a frame associated with each of said members and upon which a pair of said wheels is journaled, and means for revolving said wheels to simultaneously retard the rotation of all of said members or increase their speed.

10. In combination with a movable member, a gyroscope arranged to apply braking action to said movable member, and adjustable means for moving said gyroscope to apply or remove said braking action.

11. In combination with a movable member, a gyroscope arranged to apply braking action to or increase the speed of said movable member and means for controlling the action of said gyroscope to either apply braking action to or increase the speed of said movable member.

In testimony whereof, I have signed my name to this specification, in the presence of two subscribing witnesses.

WILLIS L. RILEY.

Witnesses:
  H. L. FISCHER,
  F. G. BRADBURY.